United States Patent
Perry et al.

(10) Patent No.: US 8,786,455 B2
(45) Date of Patent: Jul. 22, 2014

(54) TOOL LUBRICATION DELIVERY MONITORING SYSTEM AND METHOD

(75) Inventors: James William Perry, Temperance, MI (US); Chandra Jalluri, Canton, MI (US)

(73) Assignee: Ford Motor Company, Dearborn, MI (US)

(*) Notice: Subject to any disclaimer, the term of this patent is extended or adjusted under 35 U.S.C. 154(b) by 266 days.

(21) Appl. No.: 13/166,885

(22) Filed: Jun. 23, 2011

(65) Prior Publication Data

US 2012/0325321 A1 Dec. 27, 2012

(51) Int. Cl.
- G08B 13/18 (2006.01)
- G01N 21/00 (2006.01)
- G01N 7/00 (2006.01)
- G01N 11/00 (2006.01)

(52) U.S. Cl.
USPC .......... 340/631; 356/441; 73/23.33; 73/53.01

(58) Field of Classification Search
USPC ............... 340/631; 356/441; 73/23.33, 53.01; 137/487.5; 123/90.1
See application file for complete search history.

(56) References Cited

U.S. PATENT DOCUMENTS

| | | | | |
|---|---|---|---|---|
| 4,825,802 A | * | 5/1989 | Le Bec | 116/70 |
| 5,595,462 A | * | 1/1997 | Hensley | 409/132 |
| 6,167,318 A | | 12/2000 | Kizer et al. | |
| 6,276,343 B1 | * | 8/2001 | Kawamura et al. | 123/520 |
| 6,588,385 B2 | * | 7/2003 | Fuwa | 123/90.11 |
| 7,089,895 B2 | * | 8/2006 | Naber et al. | 123/90.11 |
| 7,383,097 B2 | | 6/2008 | Jalluri et al. | |
| 7,571,022 B2 | | 8/2009 | Jalluri et al. | |
| 8,353,180 B2 | * | 1/2013 | Okamoto et al. | 62/470 |
| 2006/0171788 A1 | * | 8/2006 | Doerr et al. | 409/135 |
| 2007/0289815 A1 | | 12/2007 | Frowiss et al. | |
| 2010/0089583 A1 | * | 4/2010 | Xu et al. | 166/298 |
| 2011/0071773 A1 | * | 3/2011 | Saylor | 702/45 |

FOREIGN PATENT DOCUMENTS

| | | |
|---|---|---|
| JP | 2007021608 A | 2/2007 |
| JP | 2010196088 A | 9/2010 |
| WO | 2010077282 A1 | 7/2010 |
| WO | 2010099972 A1 | 9/2010 |

OTHER PUBLICATIONS

SKF, "Sustainable Productions Using minimal Quantity Lubrication," publication date unknown.
Schunk Inc., "Knowledge Base 01-Minimum Quantity Lubrication," Apr. 2008, Morrisville, NC.
Alexander Stoll and Richard Furness, "Near-Dry Machining (MQL) is a Key Technology for Driving Paradigm Shift in Machining Operations," Machining Technology, Fourth Quarter 2006.
Alan Richter, Cutting Tool Engineering, "Tool Spray," Mar. 2008, vol. 60/Issue 3, Northbrook, IL.

* cited by examiner

Primary Examiner — Jennifer Mehmood
Assistant Examiner — Omar Casillashernandez
(74) Attorney, Agent, or Firm — Damian Porcari; Brooks Kushman P.C.

(57) ABSTRACT

A tool lubrication delivery monitoring system and a method of control. An accelerometer is provided to detect a position of a valve and fluid flow through the valve. Accelerometer data may be compared to a baseline profile to determine whether fluid flow or valve operation is within established parameters.

20 Claims, 2 Drawing Sheets

TOOL LUBRICATION DELIVERY MONITORING SYSTEM AND METHOD

TECHNICAL FIELD

A tool lubrication delivery system and method of control are disclosed.

BACKGROUND

An oil mist generating system and method are disclosed in U.S. Pat. No. 6,167,318.

SUMMARY

In at least one embodiment a tool lubrication delivery system is provided. The tool lubrication delivery system includes a fluid supply unit disposed on a spindle. The fluid supply unit has a valve assembly that includes a valve. The valve moves along an axis between a closed position in which flow of a lubricant is inhibited and an open position in which flow of the lubricant is permitted. An accelerometer is disposed on the valve assembly along the axis for detecting acceleration of the valve.

In at least one embodiment, a method of monitoring lubrication flow to a cutting tool is provided. The method includes providing a baseline acceleration profile representative of a position of a lubricant flow control valve of a valve assembly. Data from an accelerometer disposed on the valve assembly indicative of a position of the valve is compared to a threshold range that is based on the baseline acceleration profile. A warning signal is provided when the data is not within the threshold range.

In at least one embodiment a method of controlling a tool lubrication delivery system is provided. The method includes providing a baseline acceleration profile indicative of operation of a fluid supply unit that is disposed on a spindle and that controls the supply of an aerosol having a lubricant to a fluid passage of a cutting tool. The baseline acceleration profile has first, second, and third regions. First, second, and third threshold values are determined based on the first, second, and third regions, respectively. Data from an accelerometer disposed on the fluid supply unit is provided and one of the first, second, and third threshold values is selected. The data from the accelerometer is compared to the selected one of the first, second and third threshold values. A warning signal is generated when the data exceeds the selected threshold value.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
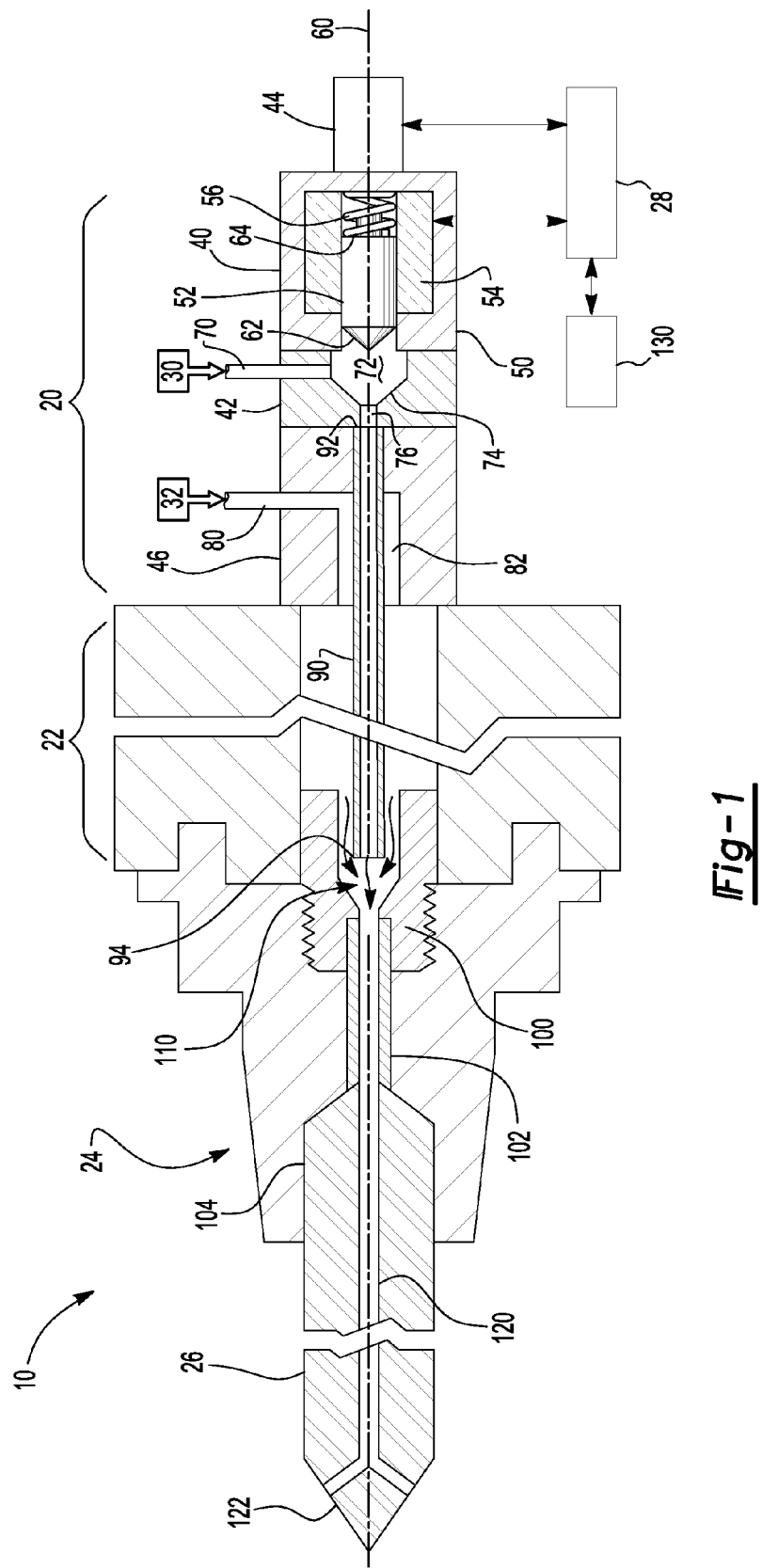
FIG. 1 is a fragmentary section view of an exemplary tool lubrication delivery system.

Referring to FIG. 1, an exemplary embodiment of a tool lubrication delivery system 10 is shown. The system 10 may be associated with a machine tool that may employ a minimum quantity lubrication (MQL) system in which a first fluid, such as a lubricant, is mixed with a second fluid, such as air, and provided to a cutting tool. The system 10 may include a fluid supply unit 20, a spindle 22, a tool holder 24, a cutting tool 26, and a control subsystem 28.

The fluid supply unit 20 may be configured to supply a first fluid 30 and a second fluid 32. In at least one embodiment, the first fluid 30 may be a lubricant, such as oil or cutting fluid, and the second fluid 32 may be a gas, such as air. The fluid supply unit 20 may include a valve assembly 40, a meter block 42, an accelerometer 44, and a rotary transmission 46.

The valve assembly 40 may be configured to control or regulate the supply of the first fluid 30. The valve assembly 40, which may also be referred to as a quick valve, may include a housing 50, a valve 52, a first actuator 54, and a second actuator 56.

The housing 50 may receive and guide movement of valve 52. For example, the housing 50 may include a cavity that receives the valve 52 and permits the valve to move along an axis 60. The valve 52 may be configured to move between an open position in which the valve 52 permits flow of the first fluid 30 and a closed position in which the valve 52 inhibits flow of the first fluid 30. In at least one embodiment, the valve 52 may be coaxially disposed with and move along the axis 60.

The valve 52 may include a first end 62 and a second end 64 disposed opposite the first end. The first end 62 may be configured to extend from the housing cavity through an opening in the housing 50 and toward the meter block 42. In at least one embodiment, the first end 62 of the valve 52 may engage the meter block 42 when the valve 52 is in the closed position and may be spaced apart from the first end 62 in the open position.

The first actuator 54 may be provided to selectively actuate the valve 52. The actuator 54 may be of any suitable type, such as a solenoid. The first actuator 54 may be electrically connected to the control subsystem 28, which may control operation of the first actuator 54 as will be described in more detail below.

The second actuator 56, if provided, may also be configured to actuate the valve 52. The second actuator 56 may be of any suitable type. In the embodiment shown, the second actuator 56 is configured as a spring that has a first end that engages the housing 50 and a second end disposed opposite the first end that engages the second end 64 of the valve 52. The second actuator 56 may bias the valve 52 toward the closed position.

The meter block 42 may be fixedly disposed on the valve assembly 40. The meter block 42 may be provided as a separate component or may be integrated with the valve assembly 40 in one or more embodiments. The meter block 42 may include a first inlet 70 that receives the first fluid 30. The first fluid 30 may be provided under pressure from a reservoir that may be remotely located from the fluid supply unit 20. The first inlet 70 that may be fluidly connected to a first chamber 72 of the meter block 42. The first chamber 72 may include a valve seat surface 74 that may be engaged by the valve 52 when the valve 52 is in the closed position. A first passage 76 may be disposed adjacent to the valve seat surface 74. The first fluid 30 may flow through the first passage 76 when the valve 52 is not in the closed position.

The accelerometer 44 may be disposed on the valve assembly 40 and may be configured to detect acceleration forces associated with the valve 52 and first fluid 30. The accelerometer 44 may be disposed on the housing 50 opposite the meter block 42. Moreover, the accelerometer 44 may be coaxially disposed with the axis 60 so that it may properly detect acceleration forces along the axis 60, such as axial movement of the valve 52 or the first fluid 30. The accelerometer 44 may detect movement of the valve 52, such as the deceleration of the valve 52 when it reaches the open or closed positions. In addition, the accelerometer 44 may detect acceleration or deceleration associated with movement of the first fluid 30, such as movement with respect to the first axis 60. The accelerometer 44 may be of any suitable type. For instance, the accelerometer 44 may have a piezoelectric, capacitive, electromechanical, or acoustic emissions-based configuration. The accelerometer 44 may be electrically coupled to the control subsystem 28 as will be discussed in more detail below.

The rotary transmission 46 may facilitate coupling of the fluid supply unit 20 to the spindle 22. The rotary transmission 46 may be fixedly disposed on the meter block 42 opposite the valve assembly 40. An opposite surface of the rotary transmission 46 may engage the spindle 22 and permit the spindle 22 to rotate with respect to the fluid supply unit 20. The rotary transmission 46 may include a second inlet 80 that receives the second fluid 32. The second fluid 30 may be provided under pressure from a reservoir, such as a pneumatic cylinder, that may be remotely located from the fluid supply unit 20. The second inlet 80 may be fluidly connected to a second passage 82 that may extend partially through the rotary transmission 46 and at least partially through the spindle 22 in one or more embodiments. The second passage 82 may be coaxially disposed about the axis 60.

A lance 90 may be disposed in the second passage 82. The lance 90 may be configured as a hollow tube and may have a first end 92 and a second end 94 disposed opposite the first end 92. The first end 92 may be fluidly coupled to the first passage 76 of the meter block 42 for receiving the first fluid 30. The second end 94 may be disposed near the tool holder 24 as will be discussed in more detail below. The lance 90 may be at least partially spaced apart from a surface of the second passage 82 such that the second fluid 32 may flow around the lance 90 and through the rotary transmission 46 and spindle 22 toward the second end 94. In addition, the lance 90 may be coaxially disposed with the axis 60.

The spindle 22 may be configured with respect to the fluid supply unit 20 about the axis 60. The spindle 22 may be actuated or rotated in any suitable manner, such as with a motor in a manner known by those skilled in the art. The spindle 22 may be configured to rotate the tool holder 24 and cutting tool 26 about the axis 60. The second passage 82 may extend through the spindle 24 as previously discussed.

The tool holder 24 may be fixedly disposed on the spindle 22. The tool holder 22 may include a coupling 100, a supply tube 102, and a bore 104.

The coupling 100 may be fixedly disposed on the tool holder 24 proximate the spindle 22. The coupling 100 may be mounted on the tool holder 24 in any suitable manner, such as with external threads that engage corresponding threads on the tool holder 24. The coupling 100 may include a mixing chamber 110 in which the first and second fluids 30, 32 are received. For example, the second end 94 of the lance 90 and an end of the second passage 82 may be disposed proximate the mixing chamber 110. As such, the lance 90 and second passage 82 may provide the first and second fluids 30, 32, respectively, to the mixing chamber 110 where they may be mixed or combined. In at least one embodiment, the first and second fluids 30, 32 may be mixed in the mixing chamber 110 to form an aerosol in which particles or droplets of the first fluid 30 are suspended in the second fluid 32.

The supply tube 102 may be disposed in the tool holder 24 and may fluidly connect the mixing chamber 110 and the cutting tool 26. In at least one embodiment, a first end of the supply tube 102 may be disposed in or engage the coupling 100 and receive the mixture of the first and second fluids 30, 32 from the mixing chamber 110. A second end of the supply tube 102 disposed opposite the first end may be disposed proximate the bore 104. The supply tube 102 may be omitted in one or more embodiments.

The cutting tool 26 may be received in the bore 104. The cutting tool 26 may be configured to remove material from a workpiece and may be of any suitable type, including but not limited to a chamfer tool, bore, drill, mill, reamer, or tap. An end of the cutting tool 26 may be disposed proximate or engage the second end of the supply tube 102. As such, the cutting tool 26 may receive the mixture of the first and second fluids 30, 32 in one or more fluid passages 120. The fluid passages 120 may provide or route the mixture to or near a cutting surface 122 of the cutting tool 26. The cutting tool 26 may be secured to the tool holder 24 in various manners known to those skilled in the art.

The control subsystem 28 may be configured to monitor and/or control operation of the system 10. The control subsystem 28 may include one or more controllers and may be microprocessor-based in one or more embodiments. In at least one embodiment, the control subsystem 28 may be associated with or configured as a programmable logic controller (PLC). The control subsystem 28 may control operation of the first actuator 52 and may receive signals from the accelerometer 44. In addition, the control subsystem 28 may include an output device 130 that may provide audible and/or visual information to a user. For instance, the output device 130 may include a buzzer or speaker for audible communication or feedback and an indicator light or display screen for visual communication or feedback. The control subsystem 28 may also monitor and/or control operation of the spindle 22, the supply of the first and second fluids 30, 32, and/or execution of machining operations of a machine tool or other device that accompanies the system 10. The control subsystem 28 may communicate with or be provided as part of a machine tool monitoring system or machine tool data management system, such as is disclosed in U.S. Pat. Nos. 7,383,097 and 7,571,022, which are assigned to the assignee of the present application and are hereby incorporated by reference in their entirety. In addition, the control subsystem 28 may detect or receive information regarding operation of the system 10, such as the initiation or completion of a preprogrammed machine tool operation cycle and the filtering and identification or association of accelerometer signals with the operation of the machine tool or position of the valve 52.

Figure 2:
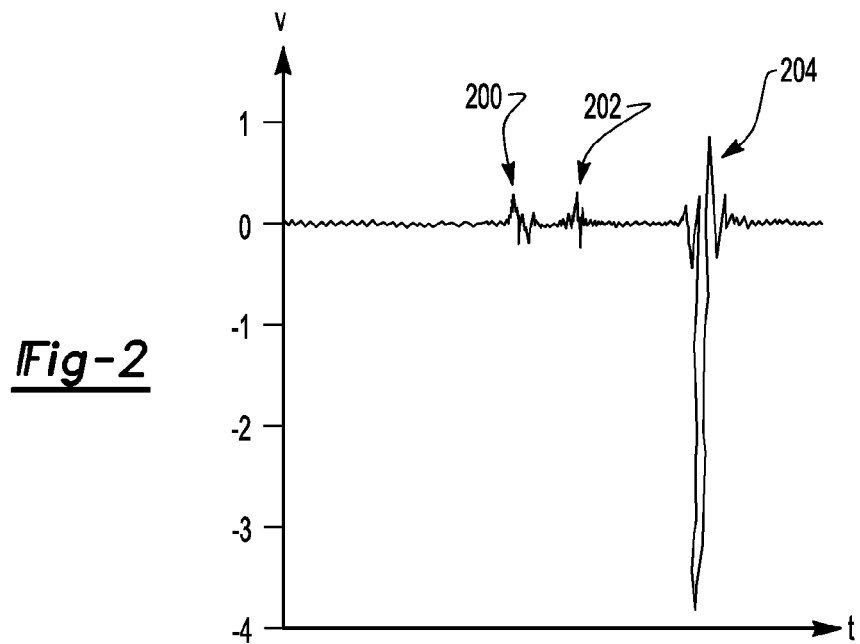
FIG. 2 is an exemplary baseline profile plot based on data from an accelerometer provided with the system.

Referring to FIG. 2, an exemplary baseline data plot is shown. The baseline data plot may be based on a signal or data detected by the accelerometer 44. In FIG. 2, acceleration data is plotted with velocity on the vertical axis and time on the horizontal axis. The plot may be representative of baseline operation profile in which the system 10 is operating within desired operating parameters (e.g., with a cutting tool installed, with proper operation of the valve and other system components, and without undesired fluid flow blockages). For instance, the baseline profile may be obtained by setting up the system 10 with a desired cutting tool and operating the system 10 in a predetermined manner in which the valve 52 is actuated to provide a predetermined or desired amount of the first and/or second fluids 30, 32 that may facilitate tool lubrication for a workpiece material removal operation. The system 10 may be operated for a predetermined period of time in which the valve 52 is periodically actuated to permit a desired amount of lubricant to flow through the lance 90. As such, the valve 52 may cycle or be repeatedly actuated at different points in time to control the flow of the first fluid 30. The desired lubrication amount may be determined based on experimentation or may be stored in memory or a lookup table.

The baseline profile plot illustrates three distinct regions that may be detected and may repeat in response to cycling of the valve 52. The first region 200 may be indicative of movement of the valve 52 to the closed position. The second region 202 may be indicative of change in flow of the first fluid 30 in the valve assembly 40. For instance, data for the second region 202 may be detected after the valve 52 moves to the closed position and may be indicative of the associated deceleration of the first fluid 30 after flow through the valve assembly 40 is inhibited by the valve 52. The third region 204 may be indicative of movement of the valve 52 to the open position. The positioning of the regions 200, 202, 204 may change depending on the time region that is plotted. For example, if the plot window begins with the second region 202 and is followed by the third region 204, then the first region 200 may be shown after the third region 204 when the valve cycles again. One or more of the regions 200, 202, 204 may be used as a baseline for comparison to determine whether the system 10 is operating within desired operating parameters. As such, baseline acceleration profile attributes, such as the magnitude and/or duration of one or more regions, may be stored in memory and used as a basis of comparison during regular system operation, such as when a material is being removed from a workpiece.

Figure 3:
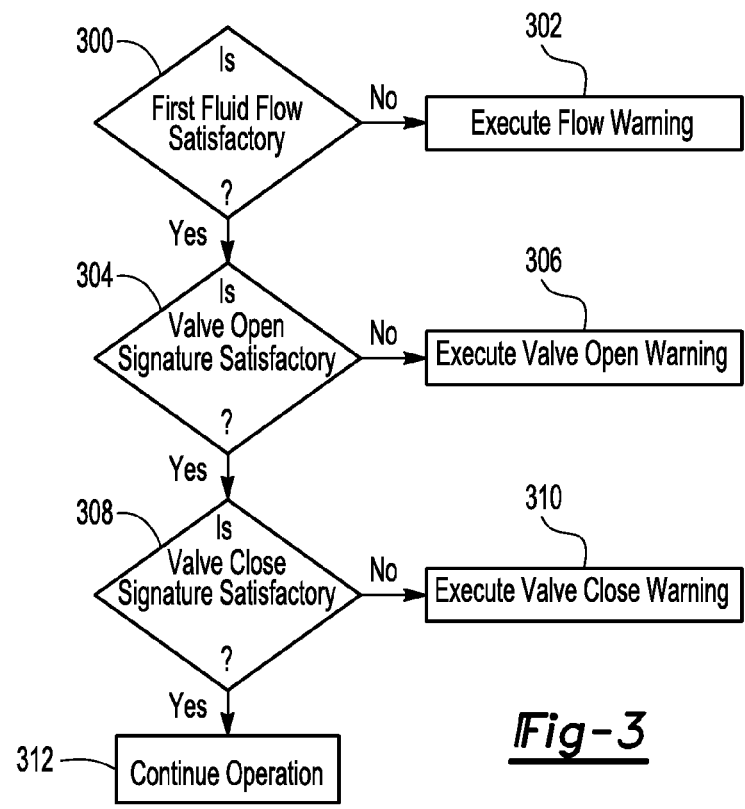
FIG. 3 is a flowchart of an exemplary method of control of the system.

Referring to FIG. 3, a flowchart is shown of an exemplary method of control that may be used with the system. The method may be employed after a baseline profile has been obtained. For instance, the method may be executed after tool setup is complete or a tool has been selected from a tool magazine and before a machining or chip creation operation is performed on a workpiece to check that proper lubrication is provided to the cutting tool. In addition, the method may be executed during or after a machining or chip creation operation is completed. One or more of the method steps may be omitted in various embodiments. In addition, one or more of the method steps, such as the decision steps, may be performed in a different sequence in one or more embodiments. Moreover, the method may be executed as a continuous loop while the system 10 is in operation. Data used by the method of control may be obtained in the same sequence as data was obtained for the baseline profile. As such, data may be associated with a particular portion or region of the baseline profile based on its order in a sequence.

At 300, the method may determine whether flow of the first fluid is satisfactory. The determination of whether flow of the first fluid is satisfactory may be based on a comparison of accelerometer sensor data to the baseline profile. For instance, a region of data associated with fluid flow, such as the second region 202, may be converted into a threshold value or a threshold range. A threshold value may be a maximum or minimum acceleration or velocity value associated with the region. Such data may be based on an average of multiple baseline readings or may be absolute maximum or minimum values from a sample of multiple baseline readings. Similarly, a threshold range may be a range that includes absolute or averaged maximum and minimum baseline reading values. If the accelerometer data is not within the threshold range, exceeds a maximum value based on one or more baseline readings, or is less than a minimum value based on one or more baseline readings, then flow of the first fluid is not satisfactory and the method continues at block 302. Fluid flow may be unsatisfactory due to a blockage downstream from the valve, such as a blockage in a fluid passage in the cutting tool or lance, a blockage upstream from the valve, insufficient first fluid supply pressure, or an empty first fluid reservoir. Otherwise, flow of the first fluid is satisfactory and the method continues at block 304.

At block 302, a flow warning may be executed. The flow warning may be executed with the control subsystem 28 and may include audible and/or visual communication to a user or system operator as previously discussed. In one or more embodiments, the flow warning may be executed after a predetermined number of repeating or sequential unsatisfactory readings are obtained to help improve confidence that an unsatisfactory condition exists. In addition, the method may include executing a shutdown strategy automatically or if a user does not respond to the flow warning. Shutdown may include retracting the cutting tool 122 from the workpiece to help avoid tool damage or terminating a machining operation without tool retraction.

At block 304, the method may determine whether the valve is opening properly. The determination of whether the valve is opening properly may be based on a comparison of accelerometer sensor data to the baseline profile. For instance, a region of data associated with retraction of the valve, such as the third region 204 may be converted into a threshold value or a threshold range. A threshold value may be a maximum or minimum acceleration or velocity value associated with the region. Such data may be based on an average of multiple baseline readings or may be absolute maximum or minimum values from a sample of multiple baseline readings. Similarly, a threshold range may be a range that includes absolute or averaged maximum and minimum baseline reading values. If the accelerometer data is not within the threshold range, exceeds a maximum value based on one or more baseline readings, or is less than a minimum value based on one or more baseline readings, then the valve may not be opening properly and the method continues at block 306. Improper opening of the valve may be indicative of failure or degradation of the first actuator 54, interference with movement of the valve 52, and ultimately an insufficient amount of first fluid or lubricant that may be provided to the cutting tool. Otherwise, opening of the valve is satisfactory and the method continues at block 308.

At block 306, a valve opening warning may be executed. The valve opening warning may be executed with the control subsystem 28 and may include audible and/or visual communication to a user or system operator as previously discussed. In one or more embodiments, the valve opening warning may be executed after a predetermined number of repeating or sequential unsatisfactory readings are obtained to help improve confidence that an unsatisfactory condition exists. In addition, the method may include executing a shutdown strategy automatically or if a user does not respond to the valve opening warning. Shutdown may include retracting the cutting tool from the workpiece to help avoid tool damage or terminating a machining operation without tool retraction.

At block 308, the method may determine whether the valve is closing properly. The determination of whether the valve is closing properly may be based on a comparison of accelerometer sensor data to the baseline profile. For instance, a region of data associated with retraction of the valve, such as the first region 200 may be converted into a threshold value or a threshold range. A threshold value may be a maximum or minimum acceleration or velocity value associated with the region. Such data may be based on an average of multiple baseline readings or may be absolute maximum or minimum values from a sample of multiple baseline readings. Similarly, a threshold range may be a range that includes absolute or averaged maximum and minimum baseline reading values. If the accelerometer data is not within the threshold range, exceeds a maximum value based on one or more baseline readings, or is less than a minimum value based on one or more baseline readings, then the valve may not be closing properly and the method continues at block 310. Improper opening of the valve may be indicative of failure or degradation of the second actuator 56, interference with movement of the valve 52, and ultimately an improper or excessive amount of first fluid or lubricant that may be provided to the cutting tool. Otherwise, closing of the valve is satisfactory and the method continues at block 312 where operation continues and the method may be repeated.

At block 310, a valve closing warning may be executed. The valve closing warning may be executed with the control subsystem 28 and may include audible and/or visual communication to a user or system operator as previously discussed. In one or more embodiments, the valve closing warning may be executed after a predetermined number of repeating or sequential unsatisfactory readings are obtained to help improve confidence that an unsatisfactory condition exists. In addition, the method may include executing a shutdown strategy automatically or if a user does not respond to the valve closing warning. Shutdown may include retracting the cutting tool from the workpiece to help avoid tool damage, terminating a machining operation without tool retraction, or completion of machining of the workpiece before shutdown occurs.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A tool lubrication delivery system comprising:
    a fluid supply unit disposed on a spindle and including a valve assembly having a valve that moves along an axis between a closed position in which flow of a lubricant is inhibited and an open position in which flow of the lubricant to a cutting tool is permitted; and
    an accelerometer disposed on the valve assembly along the axis that detects acceleration of the lubricant through the fluid supply unit, wherein the valve is disposed between the accelerometer and the cutting tool.

2. The tool lubrication delivery system of claim 1 wherein the valve assembly moves linearly along the axis.

3. The tool lubrication delivery system of claim 1 wherein the accelerometer detects acceleration of the valve.

4. The tool lubrication delivery system of claim 1 further comprising a control subsystem that controls actuation of the valve and receives data from the accelerometer, wherein the control subsystem compares data received from the accelerometer to a baseline acceleration data profile indicative of desired actuation of the valve data to determine when the valve is in the closed position.

5. The tool lubrication delivery system of claim 4 wherein the control subsystem compares data received from the accelerometer to a portion of the baseline acceleration data profile to determine whether the valve is in the open position.

6. The tool lubrication delivery system of claim 1 further comprising a control subsystem that is PLC based and controls actuation of the valve and receives data from the accelerometer, wherein the control subsystem compares data received from the accelerometer indicative of flow of the lubricant to a portion of a baseline acceleration data profile to determine when flow of lubricant through the valve assembly is inhibited.

7. A method of monitoring lubrication flow to a cutting tool, comprising:
    providing a baseline acceleration profile representative of a position of a lubricant flow control valve of a valve assembly, wherein magnitude of the baseline acceleration profile indicative of movement of a valve to a closed position is less than magnitude of the baseline acceleration profile indicative of movement of the valve to the open position;
    comparing data from an accelerometer disposed on the valve assembly indicative of a position of the valve to a threshold range based on the baseline acceleration profile; and
    providing a warning signal when the data is not within the threshold range.

8. The method of claim 7 wherein the warning signal is indicative of improper closing of the valve.

9. The method of claim 7 wherein the warning signal is indicative of improper opening of the valve.

10. The method of claim 7 wherein the warning signal is indicative of a blockage between the valve and a coolant passage in the cutting tool.

11. The method of claim 7 wherein the valve moves linearly along an axis and the accelerometer is disposed on the axis.

12. The method of claim 7 wherein the baseline acceleration profile includes first, second, and third regions, wherein a first, second, and third threshold ranges are based on the first, second, and third regions, and wherein the data from the accelerometer is continuously provided such that the data is compared to the first, second, and third threshold ranges.

13. The method of claim 7 wherein the step of comparing data and providing a warning signal is completed before the cutting tool engages a workpiece.

14. A method of controlling a tool lubrication delivery system with a valve disposed between an accelerometer and a cutting tool, comprising:
    providing a baseline acceleration profile indicative of operation of a fluid supply unit that is disposed on a spindle and that controls the supply of an aerosol having a lubricant to a fluid passage of the cutting tool, the baseline acceleration profile having first, second, and third regions;
    determining first, second, and third threshold values based on the first, second, and third regions, respectively;
    providing data from the accelerometer disposed on the fluid supply unit;
    selecting one of the first, second, and third threshold values;
    comparing the data from the accelerometer to the selected one of the first, second and third threshold values; and
    generating a warning signal when the data exceeds the selected threshold value.

15. The method of claim 14 wherein the first region is indicative of closing of the valve, the second region is indicative of fluid flow through the valve, and the third region is indicative of opening of the valve.

16. The method of claim 14 wherein the first threshold value is indicative of fluid flow through the valve.

17. The method of claim 14 wherein the second threshold value is indicative of closing of the valve.

18. The method of claim 14 wherein the third threshold value is indicative of opening of the valve.

19. The method of claim 14 further comprising the step of repeating the providing, selecting, comparing, and generating steps such that data from the accelerometer is compared to each of the first, second, and third threshold values are compared to the acceleration data.

20. The method of claim 14 wherein the step of providing a baseline acceleration profile includes detecting acceleration data with the accelerometer for a plurality of cycles of the valve between a closed position and an open position.

* * * * *